(12) United States Patent
He (10) Patent No.: US 8,731,481 B2
(45) Date of Patent: May 20, 2014

(54) DEVICE, DEVICE BASE, AND SYSTEM FOR DATA SENDING AND RECEIVING PROCESSING

(75) Inventor: Zhiqin He, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 154 days.

(21) Appl. No.: 13/161,414

(22) Filed: Jun. 15, 2011

(65) Prior Publication Data

US 2011/0241740 A1   Oct. 6, 2011

Related U.S. Application Data

(63) Continuation of application No. PCT/CN2009/070197, filed on Jan. 19, 2009.

(51) Int. Cl.
| | |
|---|---|
| *H04B 1/38* | (2006.01) |
| *H04W 92/08* | (2009.01) |
| *H04W 48/18* | (2009.01) |
| *H04W 48/16* | (2009.01) |
| *H04L 12/00* | (2006.01) |

(52) U.S. Cl.
CPC .............. *H04W 92/08* (2013.01); *H04W 48/18* (2013.01); *H04W 48/16* (2013.01); *H04L 12/00* (2013.01)
USPC ............................... 455/73; 327/141; 375/219

(58) Field of Classification Search
CPC ..... H04W 92/08; H04W 48/18; H04W 48/16; H04L 12/00

USPC ............. 455/73, 78, 83, 127.3, 84, 88, 556.1; 375/219; 327/141; 370/503, 329, 342
See application file for complete search history.

(56) References Cited

U.S. PATENT DOCUMENTS 5,874,889 A  *  2/1999  Higdon et al. ............ 340/426.36
5,917,430 A  *  6/1999  Greneker et al. ............. 340/905
(Continued)

FOREIGN PATENT DOCUMENTS

| CN | 2380432 Y | 5/2000 |
|---|---|---|
| CN | 1441261 A | 9/2003 |

(Continued)

OTHER PUBLICATIONS

International Search report of corresponding PCT application No. PCT/CN2009/070197, mailed Oct. 15, 2009, 5 pages total.

(Continued)

*Primary Examiner* — Marceau Milord
(74) *Attorney, Agent, or Firm* — Slater & Matsil, L.L.P.

(57) ABSTRACT

A system and method for data sending and receiving processing using a secondary data transmit channel is disclosed. The system comprises a device and a device base in which a secondary data transmit channel on the device is enabled when the device is coupled to the device base and receives a triggering signal from the device base. The system implements a 2T2R RF design in which the use of an additional data transmit channel increases the uplink transmit gain and coverage and reduces the deployment costs of base stations.

20 Claims, 4 Drawing Sheets

(56) References Cited

U.S. PATENT DOCUMENTS

| | | | |
|---|---|---|---|
| 6,925,292 B2* | 8/2005 | Syrjarinne et al. | 455/255 |
| 7,167,688 B2* | 1/2007 | Li et al. | 455/88 |
| 7,522,888 B2* | 4/2009 | Lu | 455/84 |
| 7,809,927 B2* | 10/2010 | Shi et al. | 712/36 |
| 7,948,948 B2* | 5/2011 | Xu et al. | 370/331 |
| 8,001,285 B1* | 8/2011 | Bar-Shalom | 710/5 |
| 8,028,074 B2* | 9/2011 | Allen | 709/227 |
| 8,320,844 B2* | 11/2012 | Ibrahim et al. | 455/84 |
| 2004/0054797 A1* | 3/2004 | Lin et al. | 709/229 |
| 2004/0204166 A1 | 10/2004 | Bae | |
| 2009/0281888 A1* | 11/2009 | Zai et al. | 705/14.25 |

FOREIGN PATENT DOCUMENTS

| | | |
|---|---|---|
| CN | 101267455 A | 9/2008 |
| CN | 101296088 A | 10/2008 |
| JP | 2008054268 A | 3/2008 |

OTHER PUBLICATIONS

Sharony, "Introduction to Wireless MIMO—Theory and Applications", IEEE IL, Nov. 15, 2006, 63 pages total.

\* cited by examiner

DEVICE, DEVICE BASE, AND SYSTEM FOR DATA SENDING AND RECEIVING PROCESSING

CROSS-REFERENCE TO RELATED APPLICATION

This application is a continuation of International Application No. PCT/CN2009/070197, filed on Jan. 19, 2009, which is hereby incorporated by reference in its entirety.

FIELD OF THE INVENTION

The present invention relates to data communications technologies, and more particularly, to an apparatus and method for data sending and receiving processing using a secondary data transmit channel.

BACKGROUND

Currently, most Worldwide Interoperability for Microwave Access (WiMAX) data cards adopt the remote frequency (RF) design of 1T2R (i.e. one transmit channel and two receive channels). These data cards have relatively small uplink gains. To increase antenna gains of the data cards, the conventional art usually uses additional antenna bases.

During the implementation of the present invention, the inventor found the following problems in the conventional art: Configuring an antenna base for a data card only slightly increases the antenna gain due to restrictions of the special shape and structure of the base. To further increase the antenna gain, the height of the base should be increased. Due to the height limit of desktop devices, however, this design contributes only slightly to the improvement of indoor coverage of data cards. Therefore, data cards with 1T2R RF design in the conventional art typically have the defects of small uplink transmit gain, small coverage, weak indoor signal, and weak wall penetration.

SUMMARY

An apparatus and method for data sending and receiving processing using a secondary data transmit channel are provided in embodiments of the present invention. These embodiments implement a 2T2R RF design in which the use of an additional data transmit channel increases the uplink transmit gain and coverage and reduces the deployment costs of base stations.

In one embodiment, the disclosure includes a device for data sending and receiving processing configured for coupling to a device base, comprising a radio frequency (RF) transceiver module; a primary data transmit channel coupled to the RF transceiver module; a secondary data transmit channel coupled to the RF transceiver module; and a triggering apparatus coupled to the secondary data transmit channel, wherein the triggering apparatus is configured to enable the secondary data transmit channel upon receiving a triggering signal from the device base.

In another embodiment, the disclosure includes a device base configured for coupling to a device for data sending and receiving processing, comprising a triggering module configured to generate a triggering signal to be received by the device for data sending and receiving processing, wherein a secondary data transmit channel disposed on the device for data sending and receiving processing is enabled upon receiving the triggering signal when the device is coupled to the device base.

In yet another embodiment, the disclosure includes a system for data sending and receiving processing, comprising a device comprising a radio frequency (RF) transceiver module, a primary data transmit channel coupled to the RF transceiver module, a secondary data transmit channel coupled to the RF transceiver module, and a triggering apparatus coupled to the secondary data transmit channel; and a device base comprising a triggering module configured to generate a triggering signal; wherein the triggering apparatus is configured to enable the secondary data transmit channel upon receiving the triggering signal when the device is coupled to the device base.

In a further embodiment, the disclosure includes a method for data sending and receiving processing in a data communications device including a primary data transmit channel and a secondary data transmit channel, comprising receiving a triggering signal from a device base upon coupling the data communications device to the device base; enabling the secondary data transmit channel upon receipt of the triggering signal; and simultaneously transmitting data using the primary data transmit channel and the secondary data transmit channel.

BRIEF DESCRIPTION OF THE DRAWINGS

FIG. 1 shows the structure of the system for data sending and receiving processing according to a first embodiment of the present invention; and FIG. 2 shows the structure of the system for data sending and receiving processing according to a second embodiment of the present invention.

DETAILED DESCRIPTION

The following describes embodiments of the present invention in detail.

Embodiments of the present invention may address one or more of the following defects in data cards in the conventional art with 1T2R RF design: small uplink transmit gain, small coverage, weak indoor signal, and weak wall penetration. The embodiments provide a 2T2R data card solution to increase the antenna gain and strength of signal.

Figure 1A:
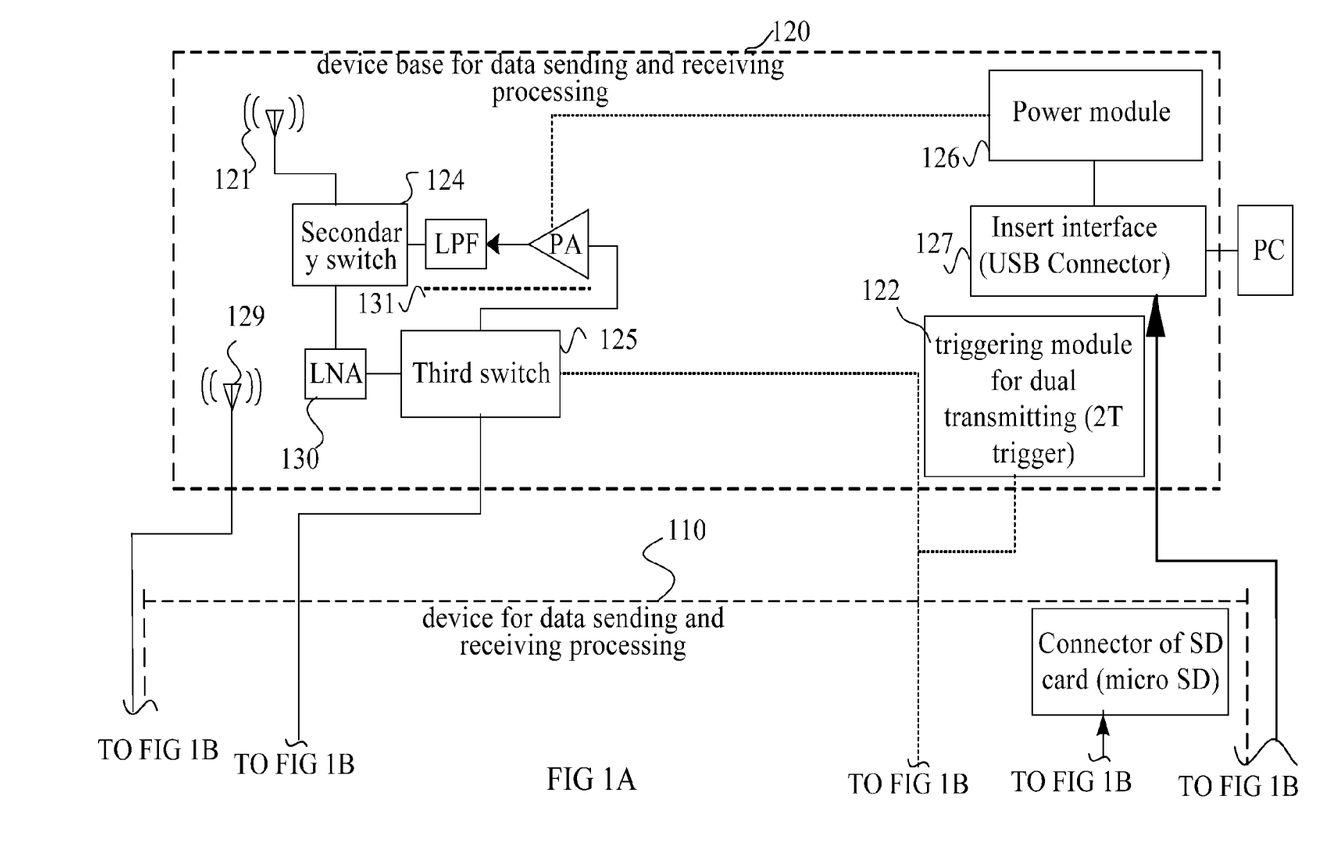
Figure 1B:
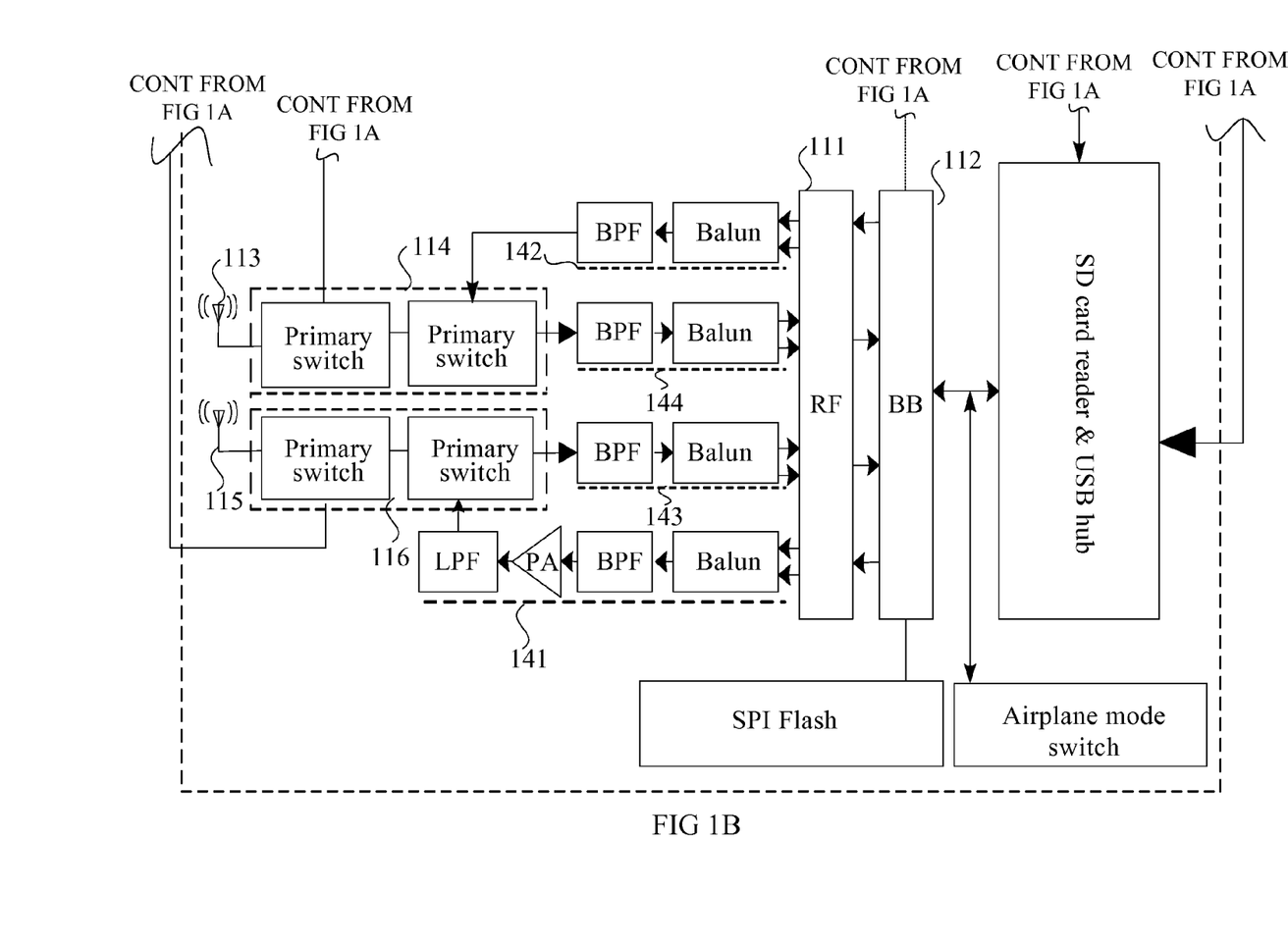

FIG. 1 shows the structure of the system for data sending and receiving processing according to a first embodiment of the present invention. As shown in FIG. 1, the system includes the device for data sending and receiving processing 110 and the device base for data sending and receiving processing 120. The device for data sending and receiving processing 110 may be a USB data card and the device base for data sending and receiving processing 120 may be a USB cradle. As shown in FIG. 1, the device for data sending and receiving processing 110 includes a serial RF transceiver module 111 and a baseband processing module 112. The RF transceiver module 111 is connected to two data receive channels (namely, primary data receive channel 143 and secondary data receive channel 144) and two data transmit channels (namely, primary data transmit channel 141 and secondary data transmit channel 142). The device for data sending and receiving processing 110 also includes two primary antennas 113 and 115, each handling both data receiving and data transmitting. Primary sending and receiving switchover modules 114 and 116 are configured between the primary antennas 113 and 115 on one side and the data receive and transmit channels 141-144 on the other side. As indicated by directions of the arrows in FIG. 1, each of the two primary data receive channels 143 and 144 between the primary sending and receiving switchover modules 114 and 116 and the RF transceiver module 111 in the device for data sending and receiving processing 110 includes a bandpass filter (BPF) and a balun connected in serial from the primary sending and receiving switchover module 114 to the RF transceiver module 11. The primary data transmit channel 141 between the primary sending and receiving switchover module 114 and the RF transceiver module 111 in the device for data sending and receiving processing 110 includes a balun, a BPF, a power amplifier (PA), and a low pass filter (LPF) connected in serial from the RF transceiver module 111 to the primary sending and receiving switchover module 114. The secondary data transmit channel 142 includes a balun and a BPF connected in serial from the RF transceiver module 111 to the primary sending and receiving switchover module 114.

As shown in FIG. 1, this embodiment includes an additional data transmit channel 142 in addition to the conventional two data receive channels and one data transmit channel. The additional data transmit channel 142 may include only part of the original data transmit channel 141. For example, the additional data transmit channel in this embodiment includes only the balun and BPF of the original data transmit channel, while the following components, such as the PA and LPF, in the original data transmit channel are configured on the USB cradle. In this manner, the 2T2R RF design is implemented on a data card through the interaction between the data card and the USB cradle.

In the device for data sending and receiving processing 110, each primary sending and receiving switchover module 114/116 is configured with a primary antenna connector for connecting to the device base for data sending and receiving processing 120. When the device for data sending and receiving processing 110 is inserted into the device base for data sending and receiving processing 120, the two primary antenna connectors may be connected to the corresponding antenna connectors in the device base for data sending and receiving processing 120. Thus, the antenna of the device base for data sending and receiving processing 120 may be used to receive and transmit data. As shown in FIG. 1, each primary sending and receiving switchover module 114/116 includes two primary switches connected in serial, one being connected to the primary antenna 113/115 and the other to the data transmit channel and receive channel. The primary antenna connector of the primary sending and receiving switchover module 114/116 may be configured on the primary switch that is connected to the primary antenna 113/115.

To implement 2T2R through cooperation between the device for data sending and receiving processing 110 and the device base for data sending and receiving processing 120, two connectors may be derived from the baseband processing module 112 on the device for data sending and receiving processing 110 as the triggering receiver for dual transmitting and the control connector respectively. A single connector may also be derived from the baseband processing module 112 to play dual roles. The triggering receiver for dual transmitting is connected to the device base for data sending and receiving processing 120 to trigger the secondary data receive channel to work. That is to say, the triggering receiver for dual transmitting, after being connected to the triggering module 122 on the device base for data sending and receiving processing 120, receives a triggering signal from the triggering module. After receiving the triggering signal, the baseband processing module 112 starts using the secondary data transmit channel 142. Thus, both the two data receive channels and the two data transmit channels in the device for data sending and receiving processing 110 are at the working status, implementing 2T2R RF design.

In this embodiment, the secondary data transmit channel in the device for data sending and receiving processing 110 includes only part of the data transmission components while the other components are configured in the device base for data sending and receiving processing 120. As a result, the control connector in the baseband processing module 112 is adapted to control the device base for data sending and receiving processing 120 to coordinate the device base for data sending and receiving processing 120 with the device for data sending and receiving processing 110 so as to implement the normal operation of the additional data transmit channel. When being inserted into the device base for data sending and receiving processing 120, the device for data sending and receiving processing 110 uses the antenna of the device base for data sending and receiving processing 120 to receive and transmit data. Therefore, the baseband processing module 112 sends a control signal for switching between data sending and receiving through the control connector to the device base for data sending and receiving processing 120. After receiving a control signal, the device base for data sending and receiving processing 120 switches to data transmit mode within a preset time so that the data from the device for data sending and receiving processing 110 through the secondary data receive channel can be transmitted successfully. Similarly, the device base for data sending and receiving processing 120 switches to data receive mode within a preset time to receive outside data successfully. The foregoing preset time is a fixed software-controlled time of the BB for switching between sending and receiving, which is usually within about 50 microseconds.

The device for data sending and receiving processing 110 provided in the embodiment has secondary data transmit channel 142, a connector to connect the corresponding antenna of the device base for data sending and receiving processing 120, a triggering receiver for dual transmitting on the baseband processing module 112 to trigger the additional data transmit channel, and a control connector to control sending and receiving of the device base for data sending and receiving processing 120. This device for data sending and receiving processing implements dual transmit channels in a USB data card for higher uplink transmit gain, larger coverage, and lower base station deployment costs.

As shown in FIG. 1, this embodiment also provides a device base for data sending and receiving processing 120, including two secondary antennas 121 and 129 and a triggering module for dual transmitting 122. A secondary antenna connector is configured on the secondary antenna 121/129, adapted to connect to the primary antenna of the device for data sending and receiving processing 110, and a triggering connector for dual transmitting is configured on the triggering module 122, adapted to provide dual triggering signals for the device for data sending and receiving processing 110. The triggering module for dual transmitting 122 is the 2T trigger shown in FIG. 1. The 2T trigger in the device base for data sending and receiving processing 120 provided in the embodiment of the present invention can be a device capable of increasing the electric level or a peripheral base pin of a single-chip microcomputer. Specifically, the 2T trigger may adopt a circuit of a single-chip microcomputer for detecting a USB device. After the USB data card 1 is inserted into the device base for data sending and receiving processing 120, the 2T trigger triggers switchover between single-channel transmission and dual-channel transmission when a USB signal is detected.

Another solution is based on electric current pulses. After the USB data card 1 is inserted into the device base for data sending and receiving processing 120, the 2T trigger transmits a serial pulse bit stream to the USB data card 1 upon detecting a USB signal. The baseband processing module 112 detects the USB pulse bit stream and triggers switchover between single-channel and dual-channel transmission. An integrated circuit of a small scale may implement hardware functions in this solution.

Yet another solution is based on a probe, where the baseband processing module 112 detects through a General-Purpose IO (GPIO) port whether the data card 1 is connected to the base 2. When the device for data sending and receiving processing 110 is inserted into the device base for data sending and receiving processing 120, the triggering receiver for dual transmitting from BB in the device for data sending and receiving processing 110 is connected to the triggering connector for dual transmitting of the triggering module for dual transmitting 122. The triggering module for dual transmitting 122 sends dual triggering signals to the baseband processing module 112, indicating the device for data sending and receiving processing 110 to start up the additional secondary data transmit channel.

The device base for data sending and receiving processing 120 also includes a secondary switch 124 and a third switch 125 which are connected in serial with the secondary antenna 121/129. The third switch 125 is configured with a secondary antenna connector and a control receive connector, adapted to receive sending and receiving control signals from the device for data sending and receiving processing 110. A third data receive channel 130 and a third data transmit channel 131 are configured between the secondary switch 124 and third switch 125 in parallel connection. The secondary switch 124 is connected to a secondary antenna 121. The third switch 125 is connected to a primary sending and receiving switchover module 114 on the device for data sending and receiving processing 110 through the secondary antenna connector. The other secondary antenna 129 on the device base for data sending and receiving processing 120 is connected to the other primary sending and receiving switchover module 116 on the device for data sending and receiving processing 110 through the secondary antenna connector configured on the device base 2. Only one of the third data receive channel 130 and the third data transmit channel 131 configured between the secondary switch 124 and the third switch 125 can work at one time. The switchover between the two channels is implemented by the third switch 125. Through the control receive connector on the third switch 125, the third switch 125 receives switch control signals from the device for data sending and receiving processing 110 to decide on a switchover between the third data receive channel 130 and the third data transmit channel 131. The foregoing third data receive channel 130 includes a low noise amplifier (LNA), and the third data transmit channel 131 includes a power amplifier (PA) and a low-pass filter (LPF) connected in serial from the third switch 125 to the secondary switch 124. Therefore, the sum of the components on the third and secondary data transmit channels is identical with the components in the primary data transmit channel.

Configured with the PA, the device base for data sending and receiving processing 120 therefore may include a power module 126 as shown in FIG. 1, to supply power to the PA. The device base for data sending and receiving processing 120 is required to include an insert interface for the device for data sending and receiving processing 110, such as the USB interface in this embodiment. The USB connector 127 is for providing an interface for connecting the USB data card 1. Of course, the power module 126 may also supply power to the USB connector 127.

When the device for data sending and receiving processing 110 is inserted into the device base for data sending and receiving processing 120 provided in this embodiment, the device base sends a dual triggering signal for enabling the additional (secondary) data transmit channel, or triggers the device for data sending and receiving processing to generate a dual triggering signal. After receiving a control signal from the device for data sending and receiving processing 110, the device base 2 performs data sending and receiving switchover to cooperate with the device for data sending and receiving processing in the 2T2R implementation, so as to increase the uplink transmit gain and coverage, and reduce the base station deployment costs.

The connection between the device for data sending and receiving processing 110 and the device base for data sending and receiving processing 120 is as follows: One primary antenna connector corresponding to the secondary data transmit channel 142 is connected to the secondary antenna connector configured on the third switch 125. The other primary antenna connector is connected to the secondary antenna connector configured on another secondary antenna 129. The triggering receiver for dual transmitting is connected to the dual triggering connector. The control connector is connected to the control receive connector.

As shown in FIG. 1, the SD card reader & USB hub on the device for data sending and receiving processing 110 can support mutual connections of multiple USB ports and SD card readers. Through the SD card reader & USB hub, the device for data sending and receiving processing 110 is connected to the USB connector on the device base for data sending and receiving processing 120, and the two base pins from the baseband processing module 112 on the device for data sending and receiving processing 110 are connected respectively to the third switch 125 and the triggering module 122 on the device base for data sending and receiving processing 120. The base pin connected to the triggering module 122 is adapted to detect whether the device for data sending and receiving processing 110 is inserted into the device base for data sending and receiving processing 120 (that is, the USB cradle). If so, the corresponding electric level of the base pin is high; otherwise, the corresponding electric level of the base pin is low; specifically, a single-chip microcomputer can be used for detecting the USB circuit. After the USB data card is inserted into the device base for data sending and receiving processing, the triggering module 122 triggers a switchover between single-channel and dual-channel transmission when detecting a USB signal.

Another solution is based on electric current pulses. After the USB data card 1 is inserted into the device base for data sending and receiving processing 120, the triggering module 122 transmits a serial pulse bit stream to the USB data card when detecting a USB signal. The baseband processing module 112 detects the USB pulse bit stream and triggers a switchover between single-channel and dual-channel transmission. A miniature integrated circuit implements hardware functions in this solution. Yet another solution is based on a probe, where the baseband processing module 112 detects through the GPIO whether the device is connected to the base. The base pin connected to the third switch 125 is adapted to control the switch for the sending and receiving switchover. In the above implementation, the two base pins from the baseband processing module 112 are the triggering receiver for dual transmitting and control connector which are described in the foregoing embodiment. When the device for data sending and receiving processing 110 is inserted into the device base for data sending and receiving processing 120, the corresponding antenna connectors will connect to each other. Thus the system for data sending and receiving processing can use the two antennas on the device base for data sending and receiving processing to receive and transmit data.

As shown in FIG. 1, the data channels in the system for data sending and receiving processing connected to the RF transceiver module 111 are as follows: After data processing, the baseband processing module 112 sends the ready transmit data to the RF transceiver module 11. In the direction indicated in FIG. 1, the transmit data travels through the balun and BPF on the secondary data transmit channel 142, and two switches 114, and then is transmitted to the third switch 125 on the device base for data sending and receiving processing 120 through the antenna connector, and next through the PA and the LPF. At last, the data is transmitted to the outside by the secondary switch 124. The route of the data transmit on the primary data transmit channel 141 is through the sequence of the balun, the BPF, the PA and the LPF, and two switches 116, and at last to the antenna 129 on the device base for data sending and receiving processing 120 where the data is transmitted to the outside.

The data receive route through the primary data receive channel 143 is as follows: Data is received by an antenna 129 on the device base for data sending and receiving processing 120, sent downlink to the switch 116 which is located in the device for data sending and receiving processing and connected with the antenna 129 on the device base for data sending and receiving processing, through a next switch 116, the BPF, and the balun respectively to the RF and the BB.

The route through the secondary data receive channel 144 is as follows: Data is received by another antenna 121 on the device base for data sending and receiving processing 120, sent to the secondary switch 124, through the LNA and the third switch 125, and then down to the switch 114 connected with another antenna 113 on the device for data sending and receiving processing 110, through the next switch 114, the BPF, and the balun respectively to the RF and the BB.

As shown in the figure, the airplane mode switch is the switch for airplane mode, the micro SD is the SD card connector, and the SPI flash is a flash device with an SPI port.

By adding a data transmit channel to the device for data sending and receiving processing 110 and the device base for data sending and receiving processing 120, the system for data sending and receiving processing provided in this embodiment implements dual transmit channels on the device for data sending and receiving processing such as the USB data card, to increase the uplink transmit gain and coverage, and reduce the base station deployment costs.

Figure 2A:
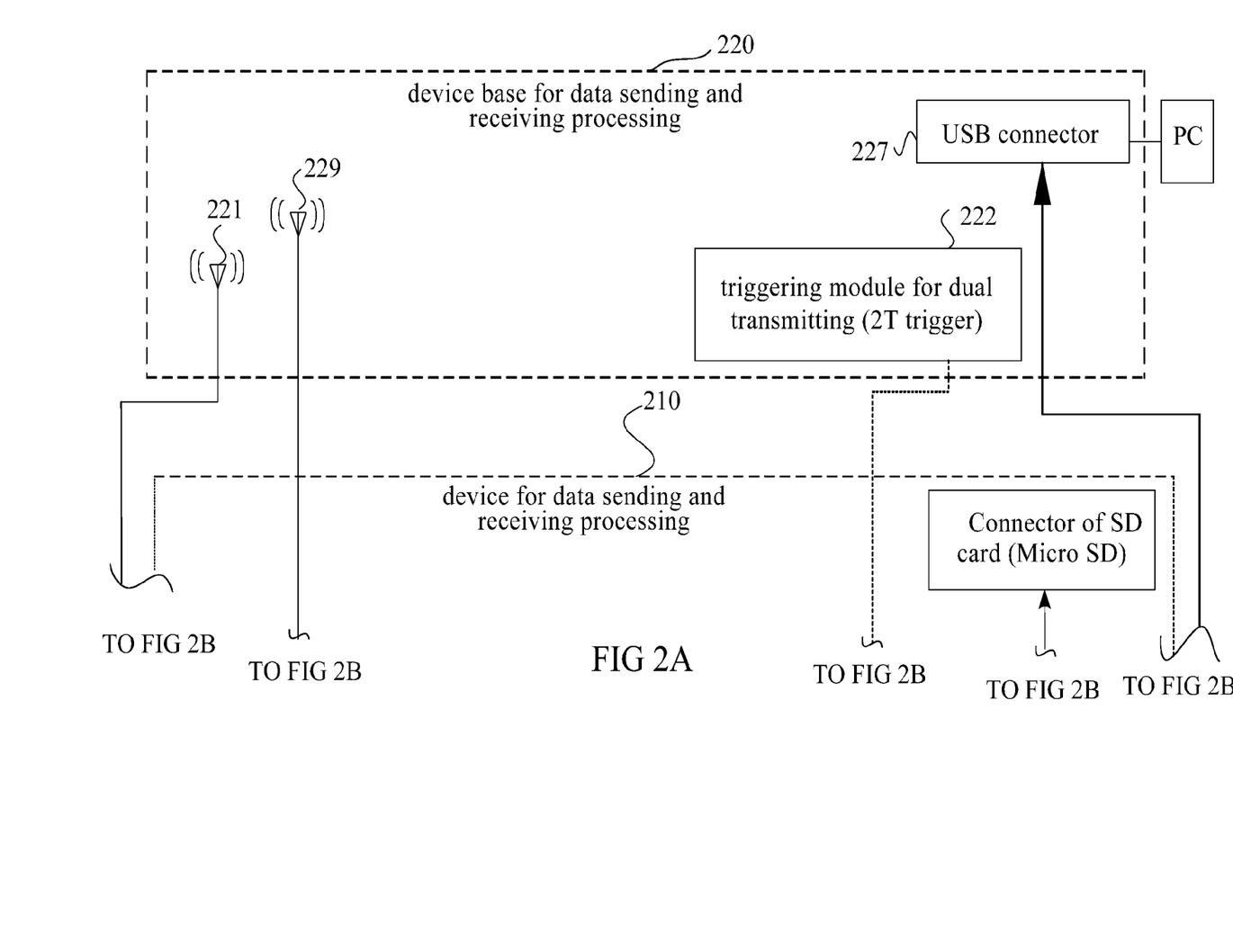
Figure 2B:
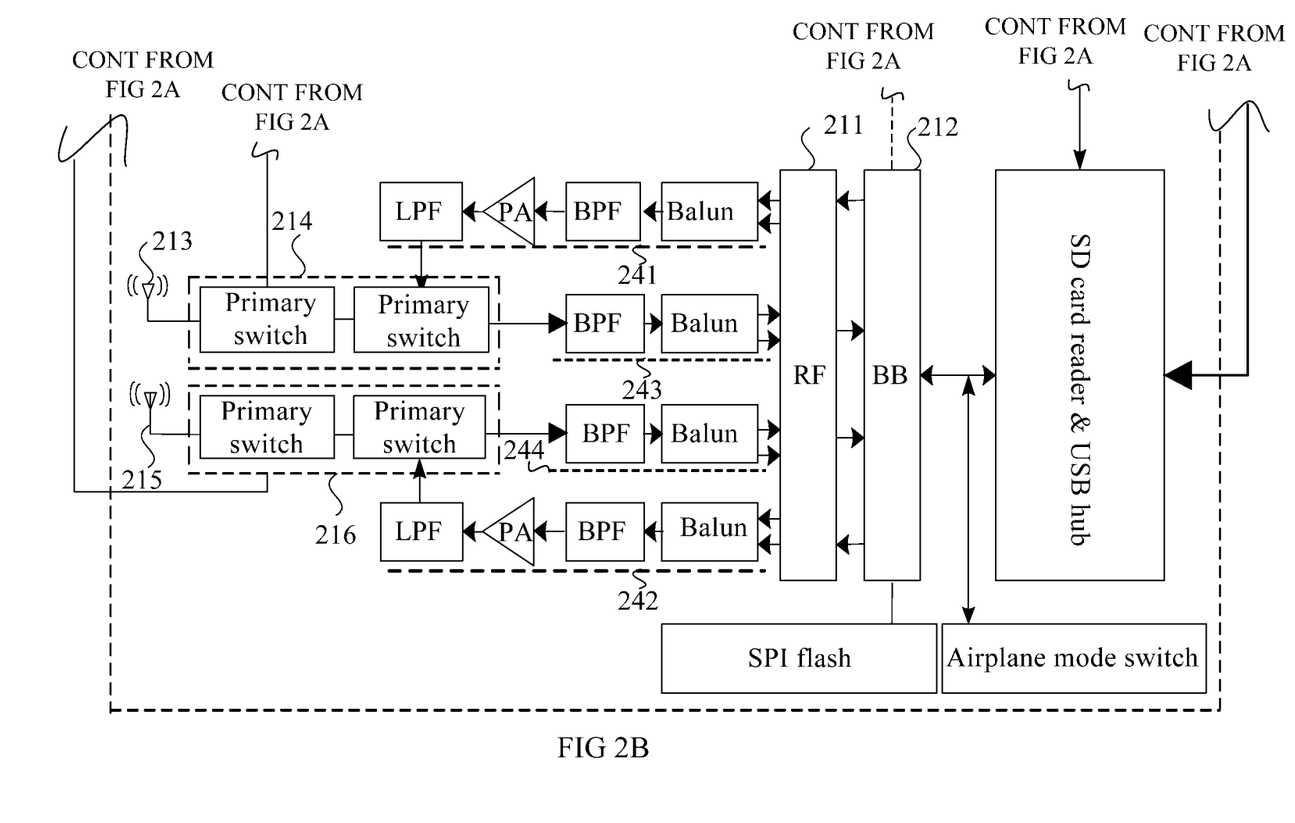

FIG. 2 shows the structure of the system for data sending and receiving processing according to a second embodiment of the present invention. As shown in FIG. 2, the system includes the device for data sending and receiving processing 210 and the device base for data sending and receiving processing 220. The device for data sending and receiving processing 210 may be a USB data card and device 2 may be a USB cradle. As shown in FIG. 2, the device for data sending and receiving processing 210 includes an RF transceiver module 211 and a baseband processing module 212 connected in serial. Two primary data receive channels and two data transmit channels connect to RF transceiver module 211. The two data transmit channels are the primary data transmit channel and the secondary data transmit channel. The device for data sending and receiving processing 210 includes two primary antennas 213/215. Each primary antenna 213/215 can receive and transmit the data. A primary sending and receiving switchover module 214/216 is configured between each primary antenna 213/215 and the data receive channel and the data transmit channel. The device for data sending and receiving processing 210 includes two primary sending and receiving switchover modules 214/216. From the direction of the arrow in FIG. 2, each of the two primary data receive channels on the device for data sending and receiving processing 210 includes the balun and the BPF connected in serial from the RF transceiver module 211 to the primary sending and receiving switchover module 214/216. The primary data transmit channel 241 between the primary sending and receiving switchover module 216 and the RF transceiver module 211 on the device for data sending and receiving processing 210 includes the balun, the BPF, the PA and the LPF connected in serial from the RF transceiver module 211 to the primary sending and receiving switchover module 216. The structure of the secondary data transmit channel 242 is identical with that of the primary data transmit channel 241. Therefore, the secondary data transmit channel 242 from the RF transceiver module 211 and the primary sending and receiving switchover module 214 also includes the balun, the BPF, the PA and the LPF connected in serial. As shown in FIG. 2, on the basis of the aforementioned two data receive channels and one data transmit channel, this embodiment adds a new data transmit channel with the same structure of the conventional data transmit channel. The 2T2R RF design is implemented for a data card through interaction between the data cards and the USB cradle.

On the device for data sending and receiving processing 210, each primary sending and receiving switchover module 214/216 is configured with a primary antenna connector connecting to the device base for data sending and receiving processing 220. When the device for data sending and receiving processing 210 is inserted into the device base for data sending and receiving processing 220, the two primary antenna connectors can connect to the corresponding antenna connector on the device base for data sending and receiving processing 220 so that the antennas of the device base for data sending and receiving processing 220 may be used for receiving and transmitting data. As shown in FIG. 2, each primary sending and receiving switchover module 214/216 includes two primary switches connected in serial. One is connected to the primary antenna 213/215, and the other is connected to the data channel. The primary antenna connector on the primary sending and receiving switchover module 214/216 may be configured on the primary switch that is connected to the primary antenna 213/215.

To implement 2T2R through the interaction between the device for data sending and receiving processing and the device base for data sending and receiving processing, one connector should be derived from the baseband processing module 212 on the device for data sending and receiving processing 210, that is, the triggering receiver for dual transmitting is adapted to connect to the device base for data sending and receiving processing 220 and trigger the secondary data receive channel to work. This means, when connecting to the triggering module on the device base for data sending and receiving processing 220, the triggering receiver for dual transmitting will receive triggering signals from the triggering module. The baseband processing module 212 will start up the additional secondary data transmit channel when receiving the triggering signals. Now the two data receive channels and the two data transmit channels are in the working state to implement the 2T2R RF design. When the device for data sending and receiving processing 210 is inserted into the device base for data sending and receiving processing 220, the antenna on the device base for data sending and receiving processing 220 is used as the port to receive and transmit data. The difference between the device for data sending and receiving processing provided in this embodiment and that provided in last embodiment is that the former implements the whole data transmit channel in the USB data card other than configures part of the channel on the device base. When the USB data card is directly connected to a computer, the data transmit channel does not work. While the USB data card is inserted into the base, the 2T trigger triggers the USB data card for starting the secondary data transmit channel.

The device for data sending and receiving processing 210 provided in the embodiment cooperates with the configured connector of the antenna corresponding to the device base for data sending and receiving processing 220 by adding a new data transmit channel. The device also implements dual transmit channels in the USB data card, increases uplink transmit gain and coverage, and reduces the deployment costs of base stations by the triggering receiver for dual transmitting adapted to trigger the additional data transmit channel which is derived from the baseband chip.

As shown in FIG. 2, this embodiment also provides a device base for data sending and receiving processing 220, including two secondary antennas 221/229 and a triggering module for dual transmitting 222. A secondary antenna connector is configured on the secondary antennas 221/229, adapted to connect to the primary antenna of the device for data sending and receiving processing 210 and a triggering connector for dual transmitting is configured on the triggering module for dual transmitting 222, adapted to provide dual triggering signals for the device for data sending and receiving processing 210. The triggering module for dual transmitting 222 is the 2T trigger in the figure. When the device for data sending and receiving processing 210 is inserted into the device base for data sending and receiving processing 220, the triggering receiver for dual transmitting from BB on the device for data sending and receiving processing 210 is connected to the triggering connector for dual transmitting of the triggering module for dual transmitting 222. The triggering module for dual transmitting 222 sends dual triggering signals to BB, instructing the device for data sending and receiving processing 210 to start up the additional secondary data transmit channel. Specifically, a single-chip microcomputer can be used for detecting the USB circuit. After the USB data card is inserted into the device base for data sending and receiving processing, the 2T trigger triggers a switchover between single-channel and dual-channel transmission when detecting a USB signal. Another solution is based on electric current pulses. After the USB data card is inserted into the device base for data sending and receiving processing, the 2T trigger transmits a serial pulse bit stream to the USB data card upon detecting a USB signal. The baseband processing module 212 detects the USB pulse bit stream and triggers a switchover between single-channel and dual-channel transmission. A miniature integrated circuit implements hardware functions in this solution. Another solution is based on a probe, where the baseband processing module 212 detects through the GPIO whether the device is connected to the base.

The device base for data sending and receiving processing 220 includes an insert interface for the device for data sending and receiving processing 210, such as the USB interface in this embodiment. The USB connector 227 is to provide an insert interface for the USB data card.

When the device for data sending and receiving processing is inserted into the device base for data sending and receiving processing provided in this embodiment, the base provides the dual triggering signals indicating to use the additional data transmit channel, or triggers the device for data sending and receiving processing to generate the dual triggering signals. Also the device base for data sending and receiving processing works with the device for data sending and receiving processing to implement 2T2R so as to increase the uplink transmit gain and coverage, and reduce the deployment costs of base stations.

The connection between the device for data sending and receiving processing 210 and the device base for data sending and receiving processing 220 is as follows:

The two primary antenna connectors connect to the two secondary antenna connectors respectively.

The triggering receiver for dual transmitting is connected to the triggering connector for dual transmitting. The device for data sending and receiving processing and the device base for data sending and receiving processing in the system can adopt those provided in the embodiment of FIG. 2. For the specific structure, reference can be made to the foregoing description. Through the data receive and transmit procedure, the following will introduce in detail how the system implements 2T2R RF design for the data card.

As shown in FIG. 2, the SD card reader & USB Hub on the device for data sending and receiving processing 210 can support mutual connections of multi USB ports and SD card readers. Through the SD card reader & USB hub, the device for data sending and receiving processing 210 is connected to the USB connector on the device base for data sending and receiving processing 220. Also one base pin from the baseband processing module 212 on the device for data sending and receiving processing 210 is connected to the 2T trigger on the device base for data sending and receiving processing 220, adapted to detect whether the device for data sending and receiving processing 210 is inserted into the device base for data sending and receiving processing 220 that is the USB cradle. If so, the corresponding electric level of the base pin is high; otherwise, the corresponding electric level of the base pin is low. Specifically, a single-chip microcomputer can be used to detect the USB circuit. After the USB data card is inserted into the device base for data sending and receiving processing, the 2T trigger triggers a switchover between single-channel and dual-channel transmission when detecting a USB signal. Another solution is based on electric current pulses. After the USB data card is inserted into the device base for data sending and receiving processing, the 2T trigger transmits a serial pulse bit stream to the USB data card upon detecting a USB signal. The baseband processing module 212 detects the USB pulse bit stream and triggers a switchover between single-channel and dual-channel transmission. A miniature integrated circuit implements hardware functions in this solution. Another solution is based on probe, where the baseband processing module 212 detects through the GPIO whether the device is connected to the base. The base pin from the baseband processing module 212 is the triggering receiver for dual transmitting described in the foregoing embodiment. When the device for data sending and receiving processing 210 is inserted into the device base for data sending and receiving processing 220, the corresponding antenna connectors will connect to each other. Thus the system for data sending and receiving processing may use the two antennas on the device base for data sending and receiving processing to receive and transmit data.

As shown in FIG. 2, the data channels in the system for data sending and receiving processing connecting to the RF transceiver module 211 from the top down are as follows:

Having processed the data, the baseband processing module 212 sends the ready transmit data to the RF transceiver module 211. According to the direction of the arrow in FIG. 2, the route of the data transmit in the primary data transmit channel 242 is in the sequence of the balun, the BPF, the PA, the LPF and two switches, then to the antenna 221 on the device base for data sending and receiving processing along the antenna connector and the data is transmitted. The route of the data transmit in the secondary data transmit channel 241 is through the fourth data channel in the sequence of the balun, the BPF, the PA and the LPF, and two switches, and at last to another antenna 229 on the device base for data sending and receiving processing where the data is transmitted to the outside. The route of the data receiving in the primary data receive channel 243 is that the data is received by the antenna 229 on the device base for data sending and receiving processing, passing down to the switch which is in the device for data sending and receiving processing and is connected with an antenna of the device for data sending and receiving processing, then through a next switch, the BPF and the balun to the RF and the BB to receive the data. The route of the secondary data receive channel 244 is that the data is received by the antenna 221 on the device base for data sending and receiving processing, then passing down to the switch which is in the device for data sending and receiving processing and is connected with another antenna of the device for data sending and receiving processing, through a next switch, the BPF and the balun to the RF and the BB to receive the data. In conclusion, the device for data sending and receiving processing implements the 2T2R RF design for the data card. As shown in the figures, in the system, the airplane mode switch is the switch for airplane mode, the micro SD is the connector of the SD card, and the SPI flash is a flash device with an SPI port.

By adding new data transmit channels on the device for data sending and receiving processing and the device base for data sending and receiving processing, the system for data sending and receiving processing provided in this embodiment implements dual transmit channels on the device for data sending and receiving processing such as the USB data card, to increase the uplink transmit gain and coverage, and reduce the deployment costs of base stations.

In some embodiments, the application of the 2T2R RF design may increase the uplink gains by 5 dB or more so as to effectively address the problems of poor indoor coverage and deployment cost of the base stations.

It is understandable to those skilled in this art that all or part of the steps described in the methods set forth in the foregoing embodiments can be implemented by a program giving instructions to related hardware. The program can be stored in computer readable storage media. Such storage media includes read-only memory (ROM), random access memory (RAM), disks or compact discs.

It should be noted that the foregoing embodiments are only used for describing the technical solutions of the present invention, instead of limiting the scope of the present invention Though the present invention is detailed above with reference to some exemplary embodiments, it is understandable to those skilled in this art that they can make various modifications to the foregoing technical solutions or substitutions to part of the technical features without departing from the protection scope of the present invention.

What is claimed is:

1. A device for data sending and receiving processing configured for coupling to a device base, the device comprising:
a radio frequency (RF) transceiver module;
a primary data transmit channel coupled to the RF transceiver module;
a first switching circuit coupled to the primary data transmit channel;
a secondary data transmit channel coupled to the RF transceiver module;
a second switching circuit coupled to the secondary data transmit channel; and
a triggering apparatus coupled to the secondary data transmit channel, wherein the triggering apparatus is configured to enable the secondary data transmit channel upon receiving a triggering signal from the device base.

2. The device for data sending and receiving processing according to claim 1, wherein the primary data transmit channel contains more active elements than the secondary data transmit channel.

3. The device for data sending and receiving processing according to claim 1, wherein the primary data transmit channel contains at least one power amplifier and the secondary data transmit channel does not contain any power amplifiers.

4. The device for data sending and receiving processing according to claim 1, wherein the primary data transmit channel comprises a balun, a bandpass filter (BPF), a power amplifier (PA) and a low-pass filter (LPF).

5. The device for data sending and receiving processing according to claim 1, wherein the secondary data transmit channel comprises a balun and a bandpass filter (BPF).

6. The device for data sending and receiving processing according to claim 1, wherein the first switching circuit is configured for coupling to at least one first antenna and the second switching circuit is configured for coupling to at least one second antenna.

7. The device for data sending and receiving processing according to claim 6, wherein one of the first antennas and one of the second antennas are each disposed on the device base.

8. The device for data sending and receiving processing according to claim 1, wherein the triggering apparatus is contained within a baseband processing module coupled to the RF transceiver module.

9. The device for data sending and receiving processing according to claim 1, wherein the triggering signal is generated by a triggering module disposed within the device base.

10. A device for data sending and receiving processing configured for coupling to a device base, the device comprising:
a radio frequency (RF) transceiver module;
a primary data transmit channel coupled to the RF transceiver module;
a first switching circuit coupled to the primary data transmit channel;
a secondary data transmit channel coupled to the RF transceiver module;
a second switching circuit coupled to the secondary data transmit channel; and
a triggering apparatus coupled to the secondary data transmit channel, wherein the triggering apparatus is configured to enable the secondary data transmit channel upon receiving a triggering signal from the device base, wherein the first switching circuit and the second switching circuit each comprise two serially-connected switches.

11. The device for data sending and receiving processing according to claim 10, wherein the primary data transmit channel contains at least one power amplifier and the secondary data transmit channel does not contain any power amplifiers.

12. The device for data sending and receiving processing according to claim 10, wherein the primary data transmit channel comprises a balun, a bandpass filter (BPF), a power amplifier (PA) and a low-pass filter (LPF), wherein the secondary data transmit channel comprises a balun and a bandpass filter (BPF).

13. A device base configured for coupling to a device for data sending and receiving processing including a primary data transmit channel and a secondary data transmit channel, the device base comprising:
- a triggering module configured to generate a triggering signal to be received by the device for data sending and receiving processing, wherein the secondary data transmit channel is enabled upon the device receiving the triggering signal when the device is coupled to the device base; and
- a third data transmit channel configured for coupling to the secondary data transmit channel disposed on the device for data sending and receiving processing when the device is coupled to the device base.

14. The device base according to claim 13, wherein the third data transmit channel comprises at least one power amplifier and the secondary data transmit channel does not have any power amplifiers.

15. The device base according to claim 13, wherein the third data transmit channel comprises a power amplifier (PA) and a low-pass filter (LPF) and the second data transmit channel disposed on the device for data sending and receiving processing comprises a balun and a bandpass filter (BPF).

16. The device base according to claim 13, further comprising an antenna configured for coupling to the secondary data transmit channel disposed on the device for data sending and receiving processing when the device is coupled to the device base.

17. A device base configured for coupling to a device for data sending and receiving processing including a primary data transmit channel and a secondary data transmit channel, the device base comprising:
- a triggering module configured to generate a triggering signal to be received by the device for data sending and receiving processing, wherein the secondary data transmit channel is enabled upon the device receiving the triggering signal when the device is coupled to the device base;
- a third data transmit channel configured for coupling to the secondary data transmit channel disposed on the device for data sending and receiving processing when the device is coupled to the device base;
- a switching circuit coupled to the third data transmit channel; and
- an antenna coupled to the switching circuit.

18. The device base according to claim 17, wherein the third data transmit channel comprises at least one power amplifier and the secondary data transmit channel does not have any power amplifiers.

19. The device base according to claim 17, wherein the third data transmit channel comprises a power amplifier (PA) and a low-pass filter (LPF) and the second data transmit channel disposed on the device for data sending and receiving processing comprises a balun and a bandpass filter (BPF).

20. The device base according to claim 17, further comprising an antenna configured for coupling to the secondary data transmit channel disposed on the device for data sending and receiving processing when the device is coupled to the device base.

* * * * *